United States Patent
Nykanen et al.

(10) Patent No.: US 7,194,235 B2
(45) Date of Patent: Mar. 20, 2007

(54) SYSTEM, METHOD, AND APPARATUS FOR FACILITATING MEDIA CONTENT CHANNELS

(75) Inventors: Petri Nykanen, Nokia (FI); Jari Mononen, Ruutana (FI); Seppo Pohja, Tampere (FI); Mikko Kolehmainen, Jarvenpaa (FI); Ulla Konkarikoski, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/452,949

(22) Filed: Jun. 3, 2003

(65) Prior Publication Data
US 2004/0248561 A1 Dec. 9, 2004

(51) Int. Cl.
*H04H 1/00* (2006.01)
(52) U.S. Cl. ............ 455/3.01; 455/414.1; 455/418; 455/45; 455/509
(58) Field of Classification Search ........... 455/414.1, 455/414.2, 414.3, 418, 419, 422.1, 466, 45, 455/3.01, 509; 709/217, 219, 203
See application file for complete search history.

(56) References Cited

U.S. PATENT DOCUMENTS

| | | | |
|---|---|---|---|
| 5,907,793 A | 5/1999 | Reams | |
| 6,085,235 A * | 7/2000 | Clarke et al. | 709/219 |
| 6,091,956 A * | 7/2000 | Hollenberg | 455/456.5 |
| 6,314,094 B1 * | 11/2001 | Boys | 370/352 |
| 6,353,444 B1 * | 3/2002 | Katta et al. | 715/716 |
| 6,525,768 B2 * | 2/2003 | Obradovich | 348/231.99 |
| 6,757,707 B1 * | 6/2004 | Houghton et al. | 709/203 |
| 2002/0142759 A1 * | 10/2002 | Newell et al. | 455/414 |
| 2002/0184314 A1 * | 12/2002 | Riise | 709/205 |
| 2003/0018745 A1 * | 1/2003 | McGowan et al. | 709/217 |
| 2003/0221191 A1 * | 11/2003 | Khusheim | 725/35 |
| 2003/0233540 A1 * | 12/2003 | Banerjee et al. | 713/153 |
| 2004/0068551 A1 * | 4/2004 | Hymel et al. | 709/217 |
| 2004/0127199 A1 | 7/2004 | Kagan et al. | |
| 2004/0203729 A1 * | 10/2004 | Makipaa et al. | 455/426.1 |
| 2004/0205155 A1 * | 10/2004 | Nobakht et al. | 709/217 |
| 2004/0240525 A1 * | 12/2004 | Karabinis et al. | 375/132 |
| 2005/0170799 A1 | 8/2005 | Strandberg et al. | |

FOREIGN PATENT DOCUMENTS

| | | |
|---|---|---|
| WO | WO 00/59220 | 10/2000 |
| WO | WO 02/067473 | 8/2002 |
| WO | WO 02/086664 | 10/2002 |

* cited by examiner

*Primary Examiner*—George Eng
*Assistant Examiner*—Huy Phan
(74) *Attorney, Agent, or Firm*—Hollingsworth & Funk, LLC

(57) ABSTRACT

A system, method and apparatus that enables end user (402) of mobile terminal (430) to establish primary content channel (426) having primary content feedback provided via path (434). In response, User Interface (UI) logic block (404) detects the primary content channel selection and queries media channel controller (406) for secondary content channel selections that may be instantiated in response to the primary content channel selection. Secondary media channel (428) is automatically established upon an affirmative match made between parameters contained within database (408) and characteristics associated with the primary media channel selection.

35 Claims, 8 Drawing Sheets

SYSTEM, METHOD, AND APPARATUS FOR FACILITATING MEDIA CONTENT CHANNELS

FIELD OF THE INVENTION

This invention relates in general to media content channels, and more particularly, to secondary media content channels established within a mobile terminal in response to a primary content channel selected by the user.

BACKGROUND OF THE INVENTION

The mobile communication industry has experienced a period of exceptional growth during the last several years. New service enablers such as the Multimedia Messaging Service (MMS), Java, and the Extensible Hypertext Markup Language (XHTML) will continue to enable compelling new services for consumers and new sources of growth for the mobile industry. The development of these mobile services will continue to grow by using consumer behavior, the business structure surrounding the mobile service domains and technology.

To insure successful take-up of the evolving mobile services, however, the consumers must be able to discover them. Currently, mobile browsing is the predominant method used by the mobile service consumer to find such services. A typical browsing session generally starts when the user accesses the mobile network using a mobile browser. The user then submits a keyword of interest from the browser to a network search engine, which returns Web page descriptions and their corresponding Uniform Resource Locators (URL) that correspond to the keyword. By traversing the URLs supplied by the search engine, the user then discovers content that may or may not be of interest to him. In large part, therefore, only through the purposeful efforts of the user are services discovered. Furthermore, the success of service discovery depends largely on the choice of keyword that is exercised by the user and often results in irrelevant search results.

Generally speaking, in order for the user to produce fast and precise search results, an efficient search infrastructure concentrating on the content relevant to the user is needed. In addition, a simple user interface with ready made search templates is required to generate an effective keyword search. Additionally, the search infrastructure should take into account the user's profile and preferences, the user's mobility, the user's location, the device profile that the user is presumably using, and the time of the search.

The use of a Service Discovery Engine (SDE) is often utilized to aid the user in finding services on the Mobile Internet. The SDE provides the user with a single interface point that facilitates the user's interaction with the carrier and Web domain registries on the network. The SDE also maintains the session information of the user's interaction with it, any transaction and interaction histories, and the user's profile and preference server information. In that way, the SDE is able to personalize its interaction with the user, so that the user's success may be maximized.

Service discovery mechanisms continue to develop as consumer's interaction with the Mobile Internet matures. In addition, browser technology is being enhanced to support the developing service discovery mechanisms. Currently, however, the state of the art is deficient in enabling the user to discover services and content that is relevant to the user's current content consumption session, such as watching TV, listening to the radio, or other similar activities.

Further, the state of the art is deficient in automatically enabling cross-media advertisements to the users who are currently consuming content related to those cross-media advertisements. In such instances, services that are relevant to the user due to their similarity with the user's current Internet session are, therefore, being withheld from the user due to the deficiencies of the state of the art. Still further, the state of the art is deficient in enabling an independent channel to be used for those services.

Rudimentary cross-media solutions do exist in the prior art, for example, between Amplitude Modulation (AM)/Frequency Modulation (FM) radio stations and their corresponding Web sites. In particular, a user is able to listen to a particular FM broadcast, while obtaining information from the radio station's web site concerning: the current song playing, the identity of the disk jockey hosting the broadcast, etc. Additionally, Web radios exist today that provide media player solutions to enable user access to background information, while primary information, e.g., a radio broadcast, is being accessed. Such solutions, however, do not automatically open the secondary channel, while the primary channel is active. Rather, the user is required to purposefully open the secondary channel on his or her own initiative.

Accordingly, there is a need in the mobile communications industry for a system, method, and apparatus that facilitates an enhanced service discovery mechanism to rectify the deficiencies of the state of the art. In particular, cross-media communication should be enabled, so that the user may automatically receive secondary or auxiliary information that may be of interest to him or her, while the user is consuming primary content. Further, the cross-media communication channel should be automatically discovered and enabled at the user's option. Still further, the cross-media communication channel should be related to the primary content being consumed by the user, so that the user's interest in the secondary content may be maximized.

SUMMARY OF THE INVENTION

To overcome limitations in the prior art, and to overcome other limitations that will become apparent upon reading and understanding the present specification, the present invention discloses a system, method, and apparatus for facilitating primary and secondary content channels.

In accordance with one embodiment of the invention, a media content channel system for providing a plurality of media content channels to a mobile user is provided. The media content channel system comprises a first network element coupled to provide primary content, a second network element coupled to provide secondary content, and a mobile terminal coupled to select the primary content. The mobile terminal comprises a media channel controller coupled to detect the selection of the primary content and coupled to instantiate a secondary media content channel to receive the secondary content in response to the selection of a primary media content channel.

In accordance with another embodiment of the invention, a mobile terminal wirelessly coupled to a network which includes a plurality of network elements capable of providing content is provided. The mobile terminal comprises a memory capable of storing at least one of a media channel controller, a primary player, a secondary player, and a database. The mobile terminal further comprises a processor coupled to the memory and configured by the media channel controller to enable the secondary player to receive content in response to detecting that the primary player is selected to receive content and a transceiver configured to facilitate content exchange with the plurality of network elements. In an alternative embodiment, the database may be external to the mobile terminal.

In accordance with another embodiment of the invention, a computer-readable medium having instructions stored thereon which are executable by a mobile terminal for facilitating content channel creation is provided. The instructions perform steps that comprise establishing a primary content channel in response to a primary content channel request, creating a secondary content channel in response to the primary content channel request, and establishing interaction capability with the secondary content channel, wherein the interaction is related to the primary content channel.

In accordance with another embodiment of the invention, a method for providing a plurality of content channels is provided. The method comprises establishing a primary content channel in response to a primary content channel request, creating a secondary content channel in response to the primary content channel request, and establishing interaction capability with the secondary content channel, wherein the interaction is related to the primary content channel.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
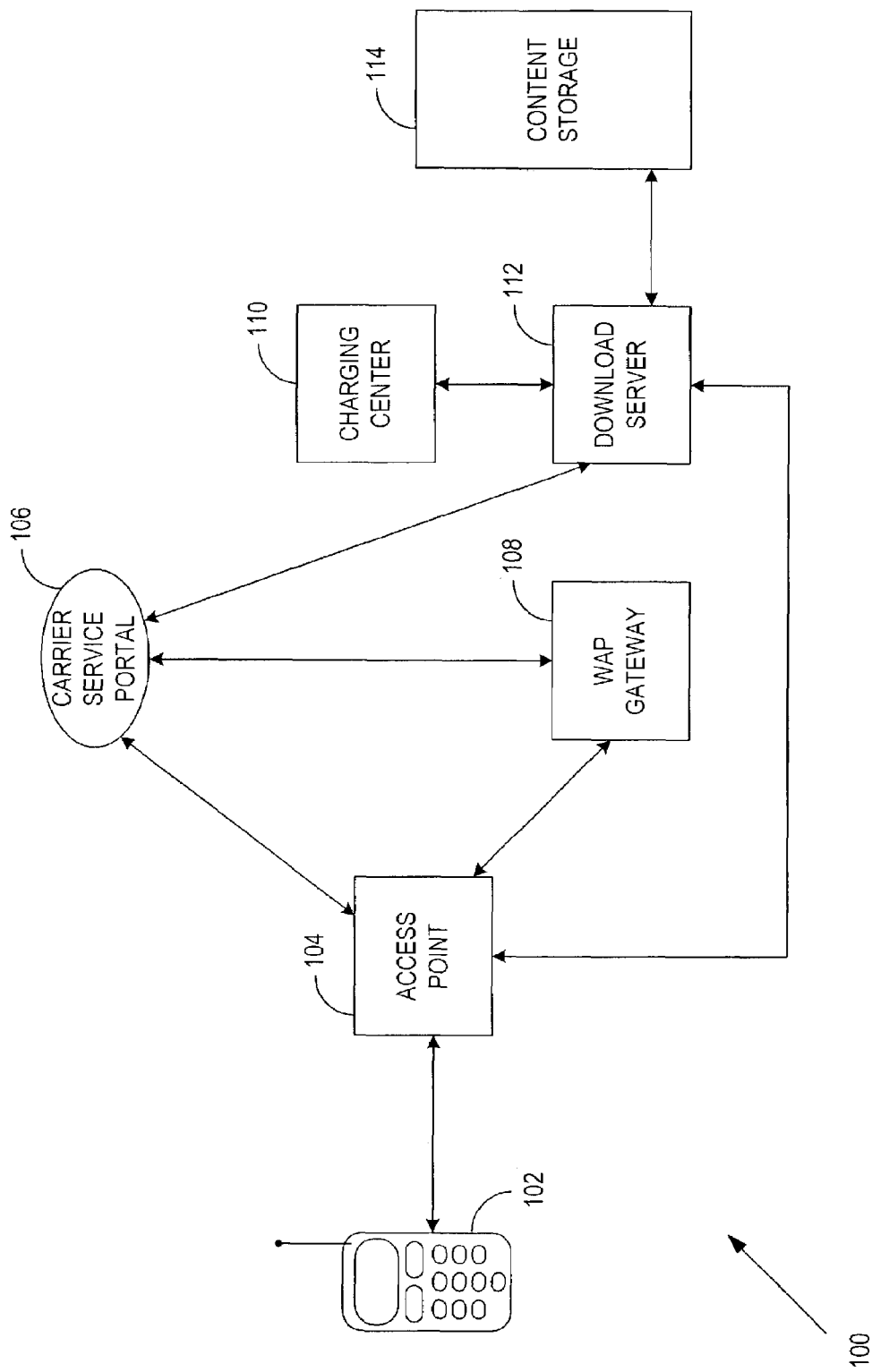
FIG. 1 illustrates a generic network architecture.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system, method and apparatus that enables a party who is in control of a primary content channel to create a supplemental content feed to the mobile terminal user. The supplemental content feed is arranged to engage the user in secondary activities that are associated with the primary content channel. In such a way, the user may be intrigued into discovery of other content, products, services, or interaction that he or she may not have otherwise been privileged to enjoy. The present invention may be used for a multitude of services, such as browser based chat, establishing a comment channel to consumed radio or TV programming, etc. In addition, a browser in accordance with the present invention having POST capability with Multi-purpose Internet Mail Extensions (MIME) type file inclusion, may create services where pictures may be uploaded from mobile terminals directly to any vertical service sites. Furthermore, the present invention supports subscription based, or secured media channels, by utilizing known technologies like username/password identification and HyperText Transfer Protocol Secure (HTTPS) functionality in the browser.

Service enablers are the basic technology building blocks for creating mobile services. The key criteria associated with the service enablers are that they: enable new and better services for consumers; provide developers with facilities that speed up the development of the new services; make new business possible for industry stakeholders; and are based on open global standards, such as those developed by the Open Mobile Alliance (OMA), to insure interoperability.

Maintaining a portfolio of compelling services and content is a critical requirement in driving a successful mobile services market. The focal point should be the consumer, since the key to service consumption is consumer acceptance. Second, a balanced business system based on healthy profit-making logic is required for successful mobile services. Third, the service enablers must conform to open global standards so that content providers, application developers, vendors/manufacturers, carriers and Information Technology (IT) vendors may provide consumers with a wide selection of interoperable devices and services. As such, the service enablers will alleviate consumer confusion and will stimulate industry growth.

The Multimedia Messaging Service (MMS) is one of the important service enablers required for successful mobile services. MMS builds upon the well established Short Messaging Service (SMS) model by adding new functions and new content types that will lead to a rapid take-up and high penetration of the mobile services that it supports. MMS supports a wide variety of content formats, thus enabling many services in addition to person to person messaging. Hence, MMS technology can be used as middleware for countless services for the Mobile domain. Further, MMS can be used as an optional delivery mechanism for content protected by Digital Rights Management (DRM), e.g., ringing tones, animated screen savers, and downloadable game packs. Consumers may also subscribe to MMS based services that facilitate push and pull content operations. These services may include headline news, daily cartoon strips, stock quotes, advertising related to the consumer's preferences, advertising related to the consumer's profile, etc.

Delivery of the content to the mobile user is effected through the use of interactive download and non-interactive download mechanisms. With interactive download, the discovery process and the actual download are an integrated process such that discovery of the content to be downloaded and the actual mechanics of downloading are part of a single session, e.g., a browsing session. In non-interactive download, however, the discovery and the delivery processes are typically separate, where messaging is used to provide the download mechanism.

FIG. 1 illustrates generic network architecture 100 used to facilitate both mobile browsing functions as well as interactive and non-interactive content download to mobile device 102. Access point 104 provides connectivity from mobile terminal 102 to carrier service portal 106, WAP gateway 108, and download server 112. Access point 104 may be implemented, for example, either as a Circuit Switched Data (CSD) service or a General Packet Radio Service (GPRS) access point. Discovery of carrier services is supported through carrier service portal 106, which supports downloadable content to consumers, e.g., mobile device 102.

In a Wireless Application Protocol (WAP) connection, WAP gateway 108 provides, among other functions, a protocol conversion from WAP to the HyperText Transfer Protocol (HTTP) that is required to access both carrier service portal 106 and download server 112. Content storage 114 provides the storage facilities for items and information that are to be delivered to consumers like mobile device 102. Download server 112 manages the download transactions, receives download requests for content, fetches the content from content storage 114, delivers the content to mobile device 102, and handles any billing that may be generated as a result of the download. Charging center 110 processes the Call Data Records (CDR) received from the download server that is used to generate the billing records. Charging center 110 may also provide in advance credit check capabilities and support for innovative pricing and business models.

Generic network architecture 100 provides the framework for WAP push technology through a Push Proxy Gateway (PPG) that may be conceptualized as being part of WAP gateway 108. A push operation in WAP is accomplished by allowing a Push Initiator (PI), e.g., an application running on download server 112, to transmit push content and instructions to a PPG, which then delivers the push content to the push client, e.g. mobile terminal 102, according the instructions. The PI communicates with the PPG via the Push Access Protocol (PAP), whereas the PPG communicates with mobile terminal 102 using the Push Over-the-Air (OTA) protocol to ultimately deliver the pushed content to mobile terminal 102. WAP push technology is particularly suited for GPRS enabled communication systems. Likewise, a WAP pull operation may also be implemented within generic network architecture 100. The WAP pull operation may utilize the WAP push operation when, for example, mobile terminal 102 requests, or "pulls" information from download server 112. In such an instance, the "pulled" information is subsequently pushed from download server 112 to mobile terminal 102 as discussed above.

Figure 2:
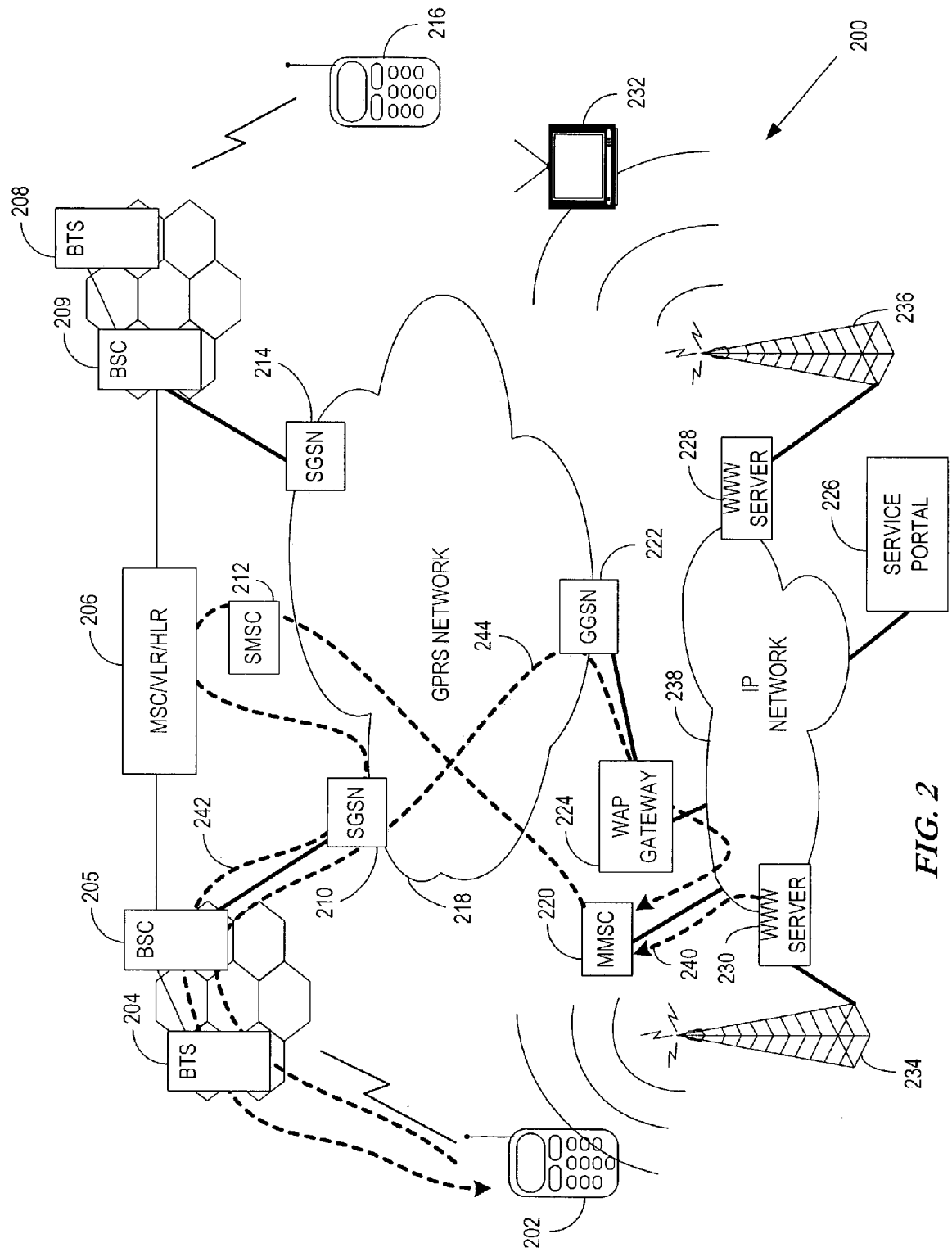
FIG. 2 is an exemplary communications network in accordance with the present invention.

FIG. 2 illustrates exemplary communication network 200 that utilizes GPRS in accordance with the present invention. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for WAP services. While the exemplary embodiments of FIG. 2 are generally described in connection with GPRS/GSM, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

Mobile terminals 202 and 216 communicate with Base Transceiver Station (BTS) 204 and 208, respectively, via an air interface. BTS 204 and 208 are components of the wireless network access infrastructure that terminates the air interface over which subscriber traffic is communicated to and from mobile terminals 202 and 216. Base Station Controller (BSC) 205 and 209 are switching modules that provide, among other things, handoff functions, and power level control in each BTS 204 and 208, respectively. BSC 205 and 209 controls the interface between a Mobile Switching Center (MSC) 206 and BTS 204 and 208, and thus controls one or more BTSs in the call set-up functions, signaling, and in the use of radio channels. BSC 205 and 209 also controls the respective interfaces between Serving GPRS Support Node (SGSN) 210 and BTS 204 and SGSN 214 and BTS 208.

SGSN 210 serves a GPRS mobile terminal by sending or receiving packets via a Base Station Subsystem (BSS), and more particularly via BSC 205 and 209 in the context of GSM systems. SGSN 210 and 214 are responsible for the delivery of data packets to and from mobile terminals 202 and 216, respectively, within the service area, and performs packet routing and transfer, mobility management, logical link management, authentication, charging functions, etc. In the exemplary GPRS embodiment shown in FIG. 2, the location register of SGSN 210 stores location information such as the current cell and Visiting Location Register (VLR) associated with mobile terminal 202, as well as user profiles such as the International Mobile Subscriber Identity Number (IMSI) of all GPRS users registered with SGSN 210. SGSN 214 performs similar functions relating to mobile terminal 216. SGSN 210 and 214 are ultimately coupled to SMSC 212 and/or MMSC 220 in connection with the presently described embodiment. While GSM forms the underlying technology, SGSN 210 and 214 described above are network elements introduced through GPRS technology. Another network element introduced in the GPRS context is the Gateway GPRS Support Node (GGSN) 222, which acts as a gateway between the GPRS network 218 and WAP gateway 224.

MMSC 220 provides messaging capabilities for the delivery of multimedia messages composed of text, photographs, video, and other media types. The messaging capabilities include mobile originated messages sent to other mobile terminals or applications and application originated messages sent to mobile terminals or other applications. MMSC 220 is responsible for storing incoming and outgoing MMS messages, as well as the transfer of messages between different messaging systems, such as an e-mail service. In addition, MMSC 220 may provide an External Application Interface (EAIF) (not shown) that allows application developers and service providers to connect to MMSC 220 to offer value added services to mobile subscribers, such as, for example, stock market quoting services or weather reporting services, via service portal 226.

Tower 234 represents an AM/FM broadcast radio station having a transmission radius sufficient to reach mobile terminal 202. Mobile terminal 202, in addition to providing GPRS connectivity, also provides separate AM/FM tuning capability. In other words, mobile terminal provides complete voice and messaging functionality through the primary media content channel enabled by its GPRS capability, but also provides a secondary media content channel enabled by its separate AM/FM tuning capability. As the user of mobile terminal 202 is consuming content delivered by the primary media content channel, for example, the user may also be enjoying his or her favorite country music radio station. AM/FM radio station 234 also has internet capability provided through WWW server 230. Thus, while AM/FM radio station 234 provides outbound AM/FM content to its listeners, e.g., mobile terminal 202, it may also interoperate within Internet Protocol (IP) network 238 through its Web page hosted by WWW server 230 and through its e-mail server (not shown) also hosted by WWW server 230.

Tower 236 represents a TV broadcast station having a transmission radius sufficient to reach TV 232. TV station 236 also has internet capability that is provided through WWW server 228, such that while TV station 236 provides outbound TV content to its viewers, e.g., the user of mobile terminal 216, it may also interoperate within IP network 238 through its Web page hosted by WWW server 228 and through its e-mail server (not shown) also hosted by WWW server 228. The user of mobile terminal 216 is assumed to be collocated with TV 232, such that while the user is enjoying his or her favorite TV station, he or she may also be accessing GPRS network 218 and IP network 238 as required for mobile browsing, messaging, rich content transfer, etc.

With the aforementioned network system described as a representative network environment, a store and forward messaging scenario is now described in which a WAP push framework is utilized to store a message sent from WWW server 230 to MMSC 220. Dashed line 240 represents the multimedia message flow from WWW server 230, which is ultimately posted to MMSC 220, which may have been a result of a previous WAP pull request from, for example, mobile terminal 202. The WAP protocol suite is used as the data transport mechanism within GPRS network 218 because WAP provides data transport services that are optimized for mobile networks. WAP also provides uniform transport services regardless of the underlying network.

In particular, the Wireless Session Protocol (WSP) layer supplies the basis of the transport mechanism, in which MMS Protocol Data Units (PDU) are used to transport media content between, for example, mobile terminal 202 and MMSC 220. MMS Headers within the PDU mainly contain information as to how to transfer the PDU from the originator to the destination. The headers may contain such information as source unit identification, sink unit identification, message identification, content type, etc. The content type may be any content type supported by MMS such as images, or video, e.g., JPEG or GIF format; and text, e.g. plain or formatted text, to name only a few. HTTP encapsulation of the MMS PDUs is required when MMS messages are transported between, for example, WAP gateway 224 and MMSC 220. The message body of HTTP encapsulation comprises any number of binary encoded, MIME message parts.

Once the multimedia message has been transmitted to MMSC 220 by WWW server 230, an indication as to the content's receipt is provided to mobile terminal 202, which is denoted by dashed line 242. Notification 242 utilizes push semantics defined by the OMA, which delivers a receipt notification to the receiving device, e.g., mobile terminal 202, via for example, an SMS bearer and Short Message Service Center (SMSC) 212. The MMS PDU that is used to send the notification message within the push message is M-Notification.ind. The M-Notification.ind informs mobile terminal 202 about the contents of received message 240 and its purpose is to allow mobile terminal 202 to fetch multimedia message 240 from MMSC 220. The Notification PDU consists of MMS headers which define characteristics of the multimedia message such as: size of the multimedia message in octets; and the location of the multimedia message, e.g., MMSC 220. Once notification message 242 has been received, a WAP/GET operation, e.g. message 244, may either be automatically or manually initiated by mobile terminal 202 in order to receive the content specified by the Uniform Resource Identifier (URI) of the notification message. Once the content has been received by mobile terminal 202, notification to the source, e.g., WWW server 230, is provided indicating successful receipt of the content.

Figure 3:
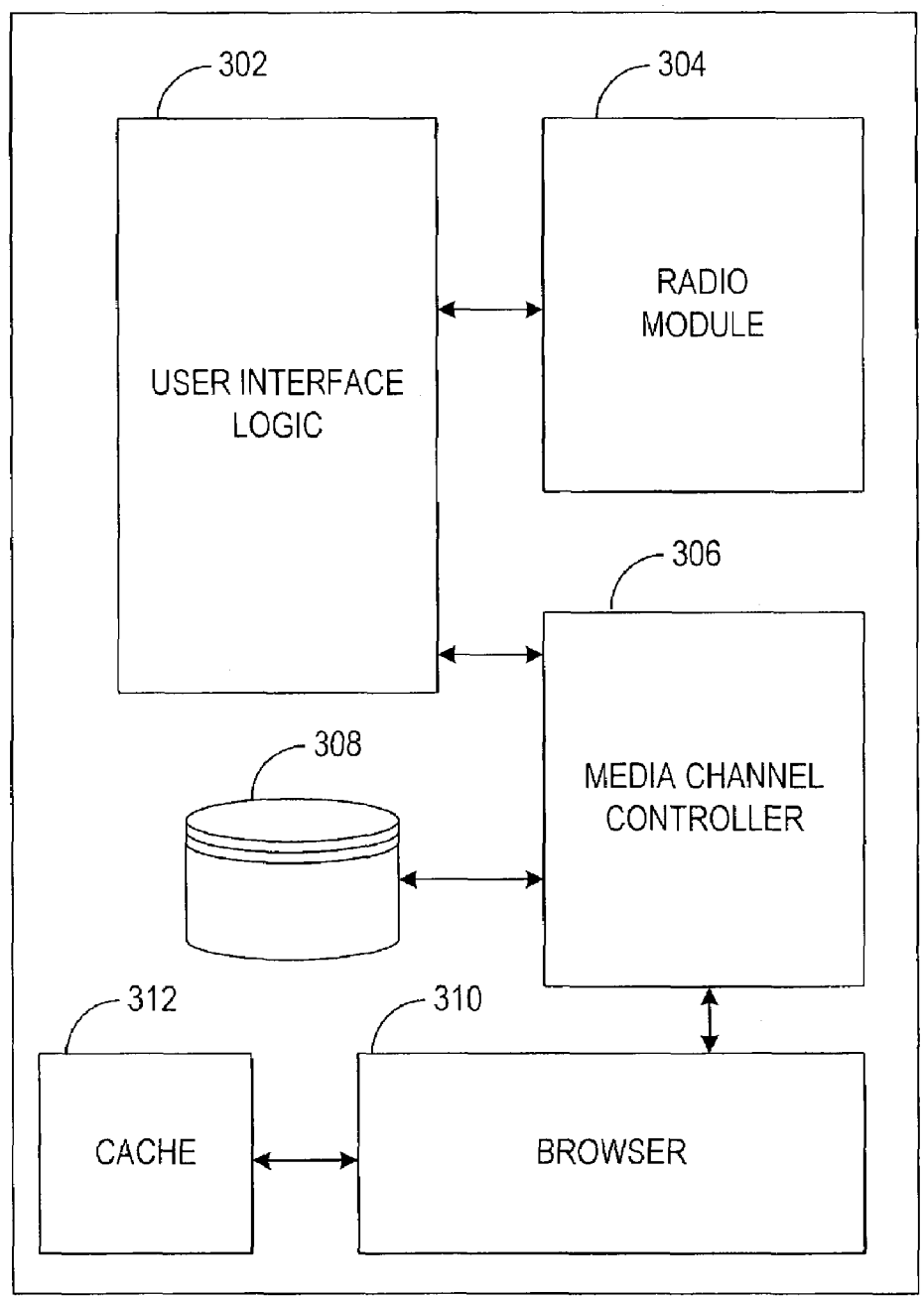
FIG. 3 illustrates a functional block diagram of a mobile terminal in accordance with the present invention.

FIG. 3 illustrates exemplary functional block diagram of mobile terminal 300, for example mobile terminal 202 of FIG. 2, that may be used in accordance with the present invention. In one embodiment, mobile terminal 300 automatically establishes a media content channel when the user tunes to a particular radio station transmitted by AM/FM radio station 234 of FIG. 2. User Interface (UI) logic block 302 is configured to allow the user of the mobile terminal to select AM/FM tuning functionality associated with radio module 304. For example, the user may access preset radio channels from UI logic block 302 that causes radio module 304 to tune its receiver in response to the particular radio channel selected by the user. The user of mobile terminal 300 is then free to enjoy the audible content that is generated by radio module 304 is response to the tuning command issued by UI logic block 302.

Once the radio channel is selected, UI logic block 302 communicates the selected channel to media channel controller 306. Media channel controller 306 may be configured by the user through the use of UI logic block 302 to react in a number of different ways in response to the received AM/FM channel selection. In one embodiment, media channel controller 306 may automatically search database 308 for any corresponding user preference data that may be associated with the particular AM/FM channel selection. A URL, for example, may have been previously associated with the selected radio channel, such that media channel controller 306 causes browser 310 to contact the associated URL via WWW server 230, in response to the user's tuning command to the particular radio station.

Once contacted by browser 310, WWW server 230 downloads all content contained within the Web page pointed to by the URL to browser 310, via for example, the WAP Push framework discussed above, or alternatively via an HTTP/GET operation followed by an HTML reply. In one embodiment, browser 310 may be configured by UI logic block 302 to fully cache the contents of the Web page information into cache 312, i.e., double-buffered mode, before display of the Web page contents takes place. Once fully loaded, browser 310 then transfers the contents from cache 312 to the display controller (not shown) of mobile terminal 300 for subsequent display to the user. In addition, browser 310 may be configured by UI logic block 302 to automatically perform a WAP pull operation from WWW server 230 at selected intervals.

Figure 4:
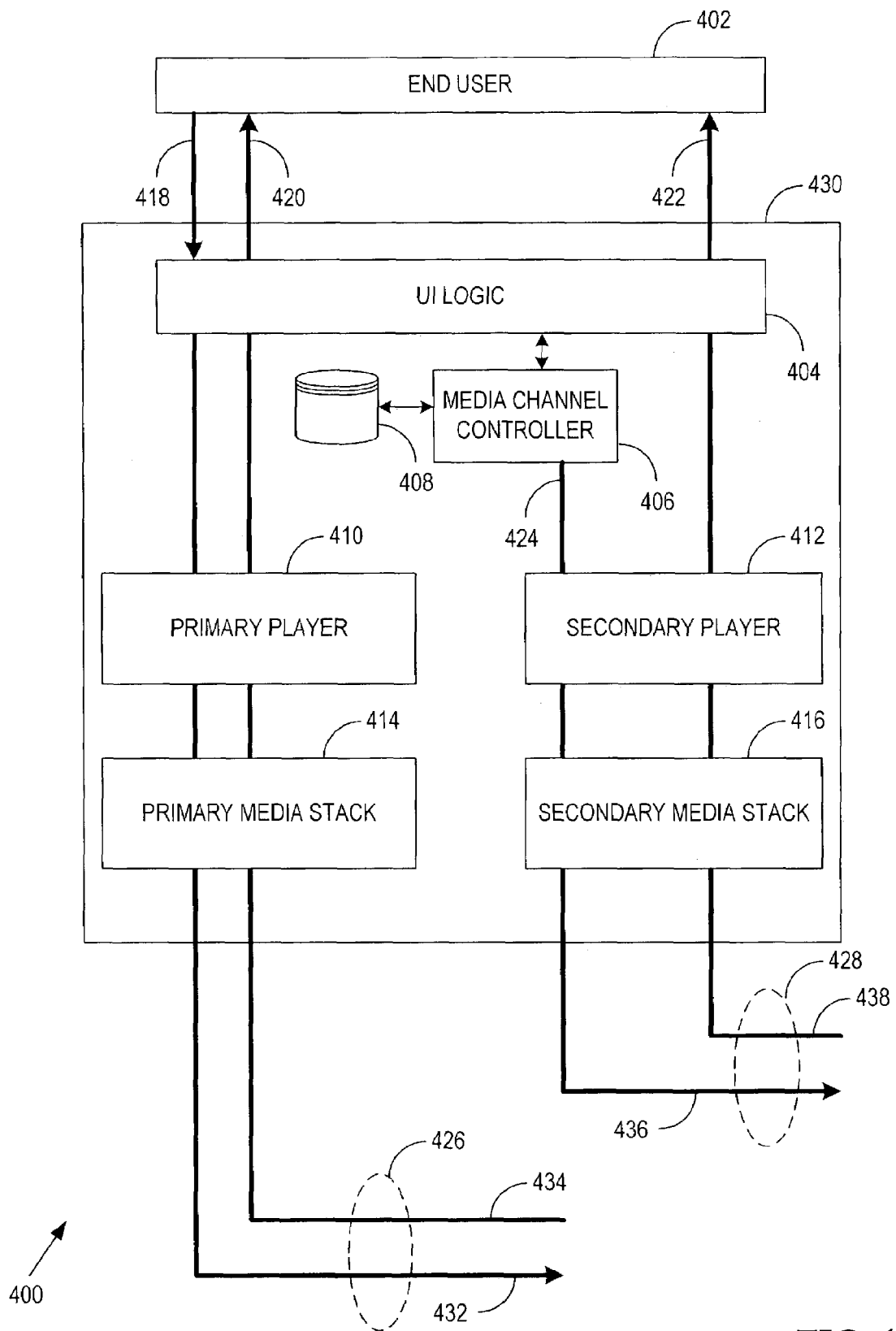
FIG. 4 illustrates generic primary and secondary content channel establishment in accordance with the present invention.

FIG. 4 illustrates block diagram 400 of generic primary and secondary content channel establishment in accordance with the principles of the present invention. End user 402 interacts with mobile terminal 430 through UI logic 404 via path 418 to instantiate primary channel 426. In addition, end user 402 may configure mobile terminal 430 via path 418 to program the operation of secondary channel 428. Primary signal 432 of primary channel 426 represents any control signal that causes the flow of a feedback signal via path 434 of primary channel 426. Feedback signal 434 of primary feedback channel 426 may either be audio feedback and/or video feedback. Similarly, primary signal 436 of secondary channel 428 represents any control signal that causes the flow of a feedback signal via path 438 of secondary channel 428. Feedback signal 438 of secondary feedback channel 428 may either be audio feedback, and/or video feedback, and/or browsable content.

In one embodiment, end user 402 may select a radio channel to listen to, where primary player 410/primary media stack 414 represents, for example, radio module 304 as shown in FIG. 3. In such an instance, primary media stack 414 represents the Radio Frequency (RF) functionality that is required to: receive the feedback content, e.g., RF content at the user selected frequency; demodulate the RF content; and present the demodulated content to end user 402 via path 420. The end user may consume the RF content through, for example, speakers (not shown) internal to mobile terminal 430 or through headphones connected to a head phone jack (not shown) of mobile terminal 430.

Once UI logic 404 has detected that end user 402 has selected an RF transmission as the primary channel, UI logic 404 optionally contacts media content controller 406 to determine whether further action is required. In one embodiment, UI logic 404 automatically contacts media channel controller 406 to search database 408 for any secondary channel pairing that may exist relating to the radio channel that end user 402 has selected as the primary channel feed. The radio channel may, for example, have an associated URL associated with it, such that audible, visual, or browsable content associated with the radio channel may be retrieved from the URL and delivered to end user 402 via secondary feedback path 438. In another embodiment, end user 402 may be queried by UI logic 404 as to whether the URL found in database 408 should be contacted. In another embodiment, end user 402 may be queried by UI logic 404 to enter a link to any other audible, visual, or browsable source that may serve the secondary feedback function. If end user 402 has affirmed his or her desire to receive the related secondary feedback signal, then media controller 406 contacts secondary player 412 and secondary media stack 416 via signal 424 to contact the secondary media source via path 436, so that a secondary content feedback channel may be set up via path 438 and ultimately consumed by end user 402 via path 422.

Figure 5:
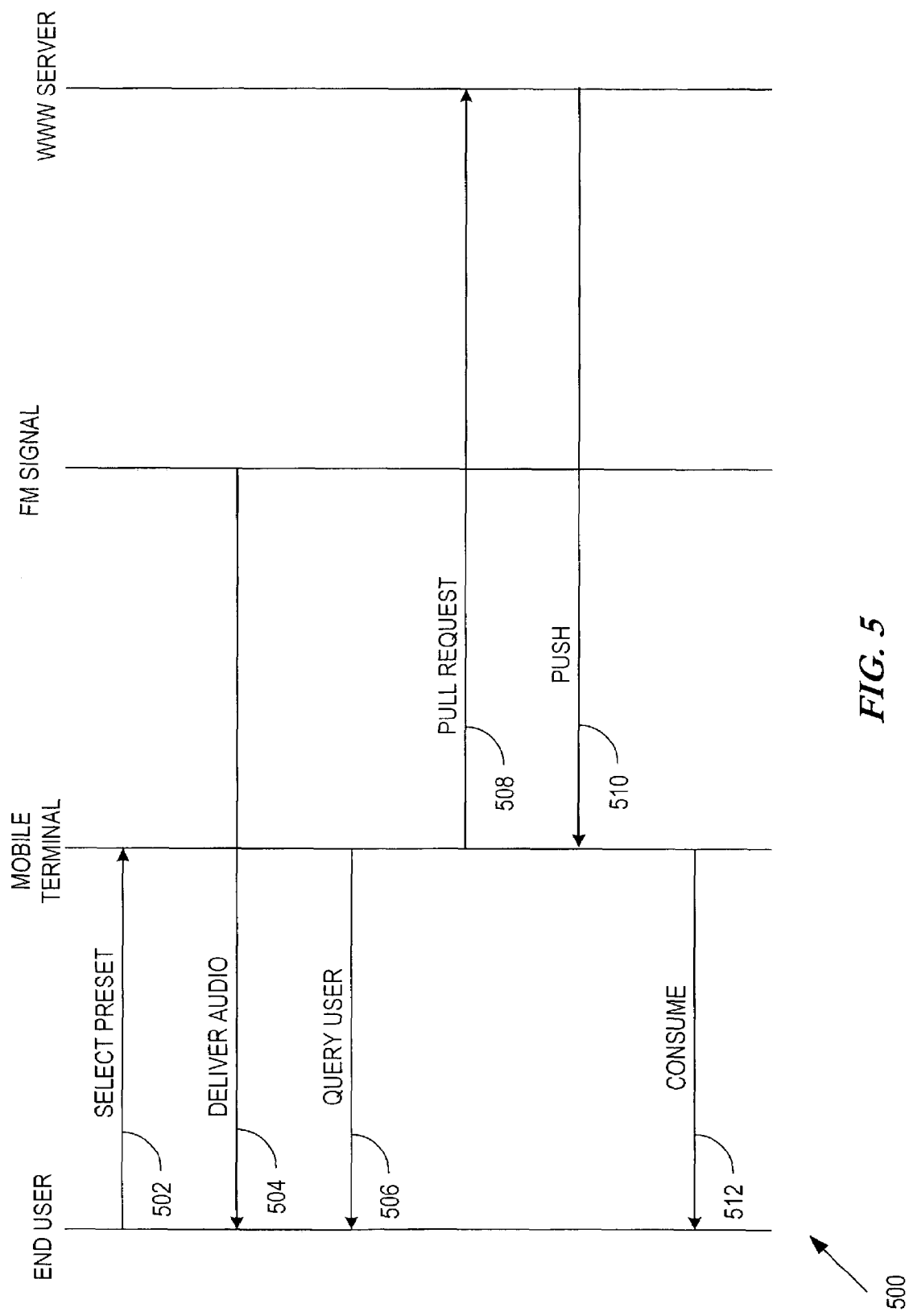
FIG. 5 illustrates a message flow diagram in accordance with the present invention.

Message flow diagram 500 of FIG. 5, in combination with FIGS. 2 through 4, are provided to establish a better understanding of an exemplary primary and secondary media content channel setup according to the present invention. The end user in this example wishes to utilize his or her mobile terminal to tune to their favorite music station in the area. In addition, the user wishes to receive any browsable content that may be delivered by the Web page that is associated with the particular radio station. The particular radio station typically provides Web page content that displays artist information of the current song that is playing, any related links to other URLs, advertisements, etc.

In step 502, therefore, end user 402 establishes communication with UI logic 404 via path 418 using either keyboard entry, touch screen entry, verbal commands, acceleration/tilt commands, etc., such that a pop up menu is presented to the user via path 420 using the mobile terminal's display. The pop up menu displays all of the preset radio station entries that end user 402 had previously entered. End user 402 then highlights one of the preset channels to indicate to UI logic 404 of his or her selection. UI logic 404 then transfers the selected preset channel to radio module 304, so that radio module 304 may tune its internal RF tuner to the user's desired radio station. Once radio module 304 has been tuned to the user's desired radio station, radio module becomes sensitive to the radio broadcast transmitted by transmitter 234 and delivers the demodulated radio information to the internal speakers (not shown) of mobile terminal 430 or headphone jack (not shown) of mobile terminal 430. End user 402 is then free to consume the delivered audio content transmitted by transmitter 234 and delivered via primary feedback path 434 of primary channel 426 as in step 504.

In step 506, media channel controller 406 automatically retrieves the preset radio selection entered by end user 402 in step 502. Media channel controller 406 then compares the radio selection with any corresponding information that may be contained within database 408. The lookup results in finding the URL that is associated with the Web page hosted by WWW server 230, which is the home page of the radio station selected by end user 402 in step 502. UI logic 404 then queries end user 402 as to whether he or she wishes to receive a secondary content channel that is comprised of the home page contents pointed to by the URL retrieved from database 408.

Since end user 402 has answered in the affirmative, browser 310 is instantiated via path 424 by media channel controller 406. Browser 310 may be, for example, any WAP, HTML, XHTML, or Wireless Markup Language (WML) enabled browser that is capable of pulling HTML information from WWW server 230. In the present scenario, a WAP pull request from the URL hosted by WWW server 230 that corresponds to the home page of the radio station selected in step 502 is performed as in step 508.

The WAP pull request results in the corresponding WAP push message of step 510. The WAP push message may correspond to, for example, message 240 from WWW server 230 to MMSC 220 as discussed above, which results in delivery notification 242 and the subsequent WAP/GET operation denoted by message 244. The information is delivered to mobile terminal 430 via secondary content feedback path 438 of secondary channel 428 and subsequently delivered to end user 402 via the display of mobile terminal 430 through path 422 as in step 512.

With the formation of the primary media content channel and subsequent automatic formation of the related secondary media content channel, the user is able to listen to the radio broadcast content, while participating with the radio station via its corresponding WWW server. For example, radio stations occasionally offer contests, whereby its listeners are challenged to identify the currently played song. The first listener to correctly identify the song and its artist, for example, wins whatever prize currently offered by the radio station. The user of the present invention is automatically enabled to participate in such a contest because the act of tuning to the radio station's broadcast automatically instantiates the secondary media content channel. Additionally, the radio station exhibits enhanced capability to attract the user of the present invention using advertisements linked by its home Web page. The user, for example, may be drawn to solicitations delivered by the secondary content channel to the advertiser's home Web pages, thus creating an additional avenue of commerce between the user of the present invention, the radio station, and its business partners.

In one embodiment, browser 310 is configured to issue WAP pull requests at predefined intervals. In such an instance, secondary player 412 may double-buffer the HTML content received from the radio station's URL, such that information displayed to end user 402 is only displayed after the entire URL's content has been downloaded to mobile terminal 430. Until that time, information gathered from the previous download is displayed to end user 402. Accordingly, up to date information may be delivered and seamlessly displayed to end user 402. The predefined download interval may be configured by end user 402, or alternatively, configured during provisioning of mobile terminal 430. Alternately, the download interval may be configured by WWW server 230 in an appropriate header or as part of the page data received from WWW server 230. The header may also specify the next pull time, or conversely a delay variable that is used by the browser player to set the amount of elapsed time before the next pull interval commences.

Still other alternatives allow the pull interval to be controlled by WWW server 230, by using WAP push cycles at predetermined intervals as determined by WWW server 230. WWW server 230, for example, may be better suited to provide the download interval control because WWW server 230 is synchronized to the radio broadcasts of radio station 234. For example, WWW server 230 knows exactly when artist information of the currently played song has changed, when contest information is available on the Web site, etc.

It is possible to set a timeout for the secondary channel pull functionality, such that secondary channel resources may be freed up if the secondary channel has not been accessed within the timeout period. This may be implemented within UI logic 404 by detecting the amount of time that has transpired since end user 402 has accessed the secondary content feedback via path 422. If the amount of time exceeds the timeout period, then UI logic 404 may instantiate a warning message to end user 402, querying the user as to his or her preference of maintaining the secondary content consumption.

In the case that secondary player 412 is a browser, a configuration option is allowed by UI logic 404, such that end user 402 may configure the focus of the secondary channel. For example, the focus may either be placed on the newly updated secondary content, or the last, end user selected secondary content. Additionally, an audible, visual, or tactile alarm may also be configured by end user 402 when the browser has detected that the secondary content has changed. End user 402 is allowed to browse secondary content based upon the content that has been fully received, such that the secondary channel content focus and spatial position on the mobile terminal's screen is kept in tact, while newly updated secondary channel content is being received. In one embodiment, the browser may detect the changes in the secondary source content either by detecting differences in the main page content, or by checking links that may be embedded into the main page content.

In the case that the browser does provide JavaScript, or similar strong scripting support, content may automatically be pulled using JavaScript code that implements background loading of the Web pages and provides the updated page contents on the screen of the mobile terminal. In addition, browsers with mobile push capability may rely on the Web server to push any newly changed content to the terminal, which enables effective and efficient use of the wireless links since information is only pushed when the Web page information has changed.

Figure 6:
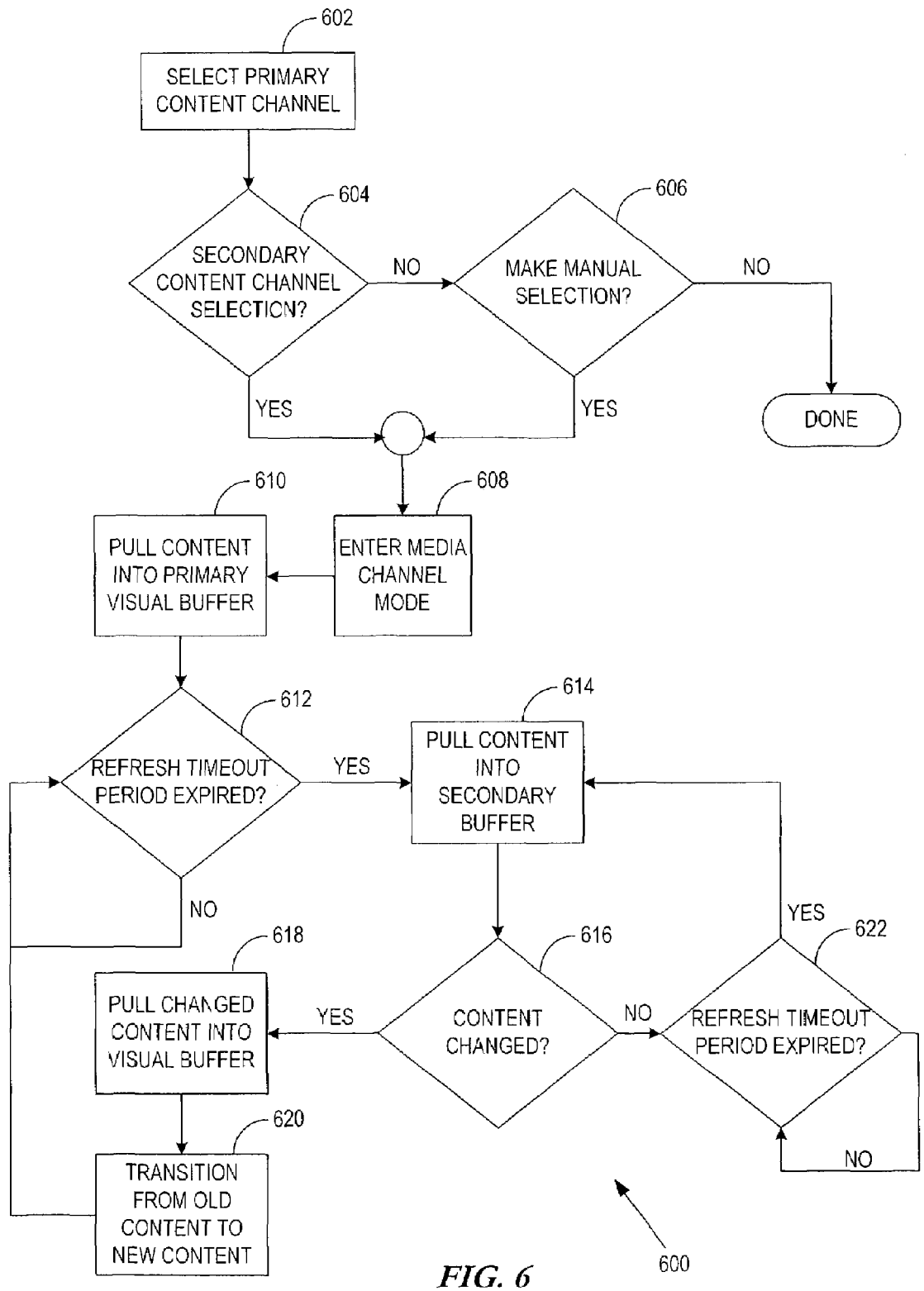
FIG. 6 illustrates a flow diagram in accordance with the present invention.

In case the browser does not exhibit JavaScript functionality, however, the operation of primary/secondary content control may be exemplified by flow diagram 600 of FIG. 6. In particular, primary content channel selection is performed in step 602. A media channel controller automatically detects the primary content channel selection in step 604 and determines whether a secondary content channel is associated with the primary channel selection. If there is no secondary content channel associated, the user is prompted in step 606 as to whether any secondary channel selection is desired. If not, then channel media mode is not entered and channel mode terminates. If, on the other hand, a secondary channel selection is made, either manually or automatically, media channel mode is entered in step 608, whereby the parameters necessary to instantiate the secondary content channel are retrieved.

Web page content is then pulled into a primary visual buffer in accordance with the secondary content channel parameters in step 610 and subsequently displayed onto the mobile terminal's display. The browser then checks to see if the refresh timer has timed out in step 612. If the time has expired, then the Web page content is pulled once again into a secondary buffer as in step 614 and then the refresh timer is reset. The browser then determines whether the newly pulled content is different from the displayed content in step 616. If not, then the refresh timer is again checked in step 622 and new content is pulled again as in step 614, if the refresh timer is expired. If the content has changed, then the changed content is transferred into a secondary visual buffer as in step 618. Once the entire content is transferred, the user's display is seamlessly transitioned from the primary visual buffer to the secondary visual buffer in step 620.

If the user continues to interact with the secondary content channel, then the browser maintains the user selected focus onto the updated secondary content channel. The user is able to configure a focus timeout, such that the focus will remain with the updated secondary content channel until expiration of the focus timeout. Upon expiration of the focus timeout, the focus will shift to the last media content channel selected by the user. If the user ceases to interact with the any media content channel, then media channel mode may be exited in a configurable amount of time.

It should be noted that primary/secondary media content selection as depicted in FIG. 4 is quite versatile. For example, the primary/secondary media content selection roles of the previous example may be switched. In other words, browsable content may be discovered using primary media stack 414 and subsequently displayed via a browser contained within primary player 410. Once the URL has been selected, UI logic 404 may submit the URL to media channel controller 406 for subsequent lookup into database 408. Database 408 may then, for example, discover that a corresponding radio station exists pertaining to the URL. Optionally, end user 402 may then request that the radio broadcast be delivered via secondary content channel 428. In this instance, secondary player 412/secondary media stack 416 comprises the necessary tuning, demodulation, and playback functions required for end user 402 to consume the radio broadcast via secondary content feedback path 422.

In another embodiment, the primary content feedback path may be fully separate from mobile terminal 430 as depicted in FIG. 2. In particular, mobile terminal 216 is being operated by a user who is co-located with TV 232. TV 232 is within the transmission radius of TV transmission station 236 and the Web page hosted by WWW server 228 is synchronized with the TV broadcasts of TV station 236. In such a case, the user of mobile terminal 216 is able to view the broadcast from TV 232 as a primary media content channel, while accessing WWW server 228 as a secondary media content channel via his or her browser executing within mobile terminal 216. The correct URL would be posted on the screen of TV 232 and subsequently typed into the browser's URL text entry box of mobile terminal 216 for subsequent access to the URL.

In an alternate embodiment, a user friendly address may be displayed on TV 232, which the user of mobile terminal 216 would then type into mobile terminal 216 for future use. The secondary media content could then be consumed at a later time via a built in, or separately downloadable HTML browser, thus maximizing the expression power given to the channel creator to exercise horizontal technologies. If more expression power is needed for secondary media consumption, it is possible to download to mobile terminal 216 a separate Symbian OS application or a Java midlet that would provide the UI for the end user and also contact the server that is hosting the content.

Generally speaking, the access method or communication channel for the primary content and secondary content may be separate or the same. That is to say, for example, that primary player 410 and secondary player 412 may be the same player or different players. In one example where a single player is used for both primary and secondary content channels, a multipurpose player such as RealOne, may be used to browse for media content in the primary media channel mode, while listening to online radio using the secondary media channel mode. In another embodiment, mobile browsing may be conducted in primary mode via the RealOne player, while advertisements from a link provided by a Web page visited during the primary browsing session are downloaded and viewed in secondary mode.

The primary and secondary content need not be visible, audible, or otherwise consumed at the same time. It is possible, for example, to toggle back and forth between the primary and secondary media content channels as desired. In one embodiment, both the primary and secondary content channels are visual in content, and may be mixed on the display device of the mobile terminal in varying formats. For example, Picture-in-Picture (PIP) format may be used to display the primary content channel using one window frame, while the secondary content channel is displayed in a second window frame. It is apparent to one of ordinary skill in the art that multiple combinations of primary/secondary media content presentation may be implemented using the mobile terminal's display, speakers, head phone jack, tactile queues, etc. to allow the mobile terminal user to effectively consume content from primary and secondary channels at the same time or separately as required.

Figure 7:
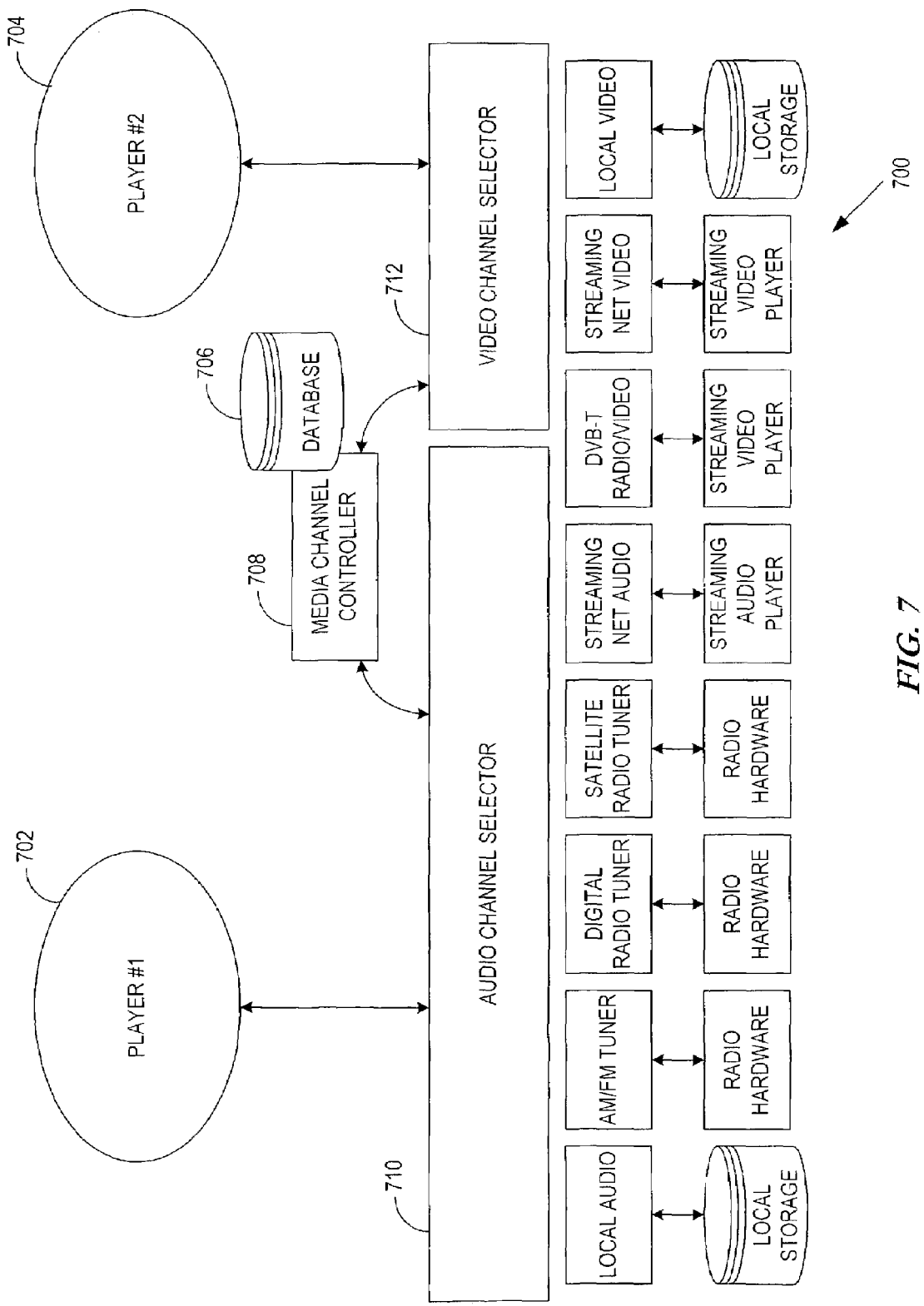
FIG. 7 illustrates an exemplary channel access method block diagram according to the present invention.

It should be noted that the primary and secondary media content channels are not tightly coupled with their corresponding access methods as illustrated in channel access method block diagram 700 of FIG. 7. Player 702 may represent any media player capable of playing virtually any audio format including: analog AM/FM, MP3, Moving Pictures Expert Group (MPEG) audio, etc. Player 704 may represent any player that is capable of playing virtually any video media format including: WindowsMedia, QuickTime, version MPEG version 4 (MPEG-4), and Digital Versatile Disk (DVD), to name only a few.

Either of media players 702 or 704 may be selected as the primary media player, where a multitude of access methods may be used for the media content. Access method diagram 700 depicts several audio/video access methods available in accordance with the present invention. Audio channel selector 710 may select any audio format from a set of audio formats including: local audio, AM/FM tuner, digital radio tuner, satellite radio tuner, streaming net audio, or Digital Video Broadcasting-Terrestrial (DVB-T) radio feeds. Likewise, video channel selector 712 may select any video format from a set of video formats including: DVB-T, streaming net video, or local video feeds. As can be seen, any combination of player to media access is acceptable, as long as the player and the media content are compatible.

Once the primary media channel has been selected, media channel controller 708 in combination with database 706 may select the corresponding secondary media channel in accordance with predefined options. In general, media channel controller 708 checks if a secondary channel is specified and if so, whether the secondary channel should be activated. It should be noted that both primary and secondary content may be derived from local storage. In case the primary content is locally stored, but the secondary content is not, the secondary content must be pulled from a server. In such a case, the server that is supplying the pulled content should preserve the timing that is associated with the locally stored primary content.

Figure 8:
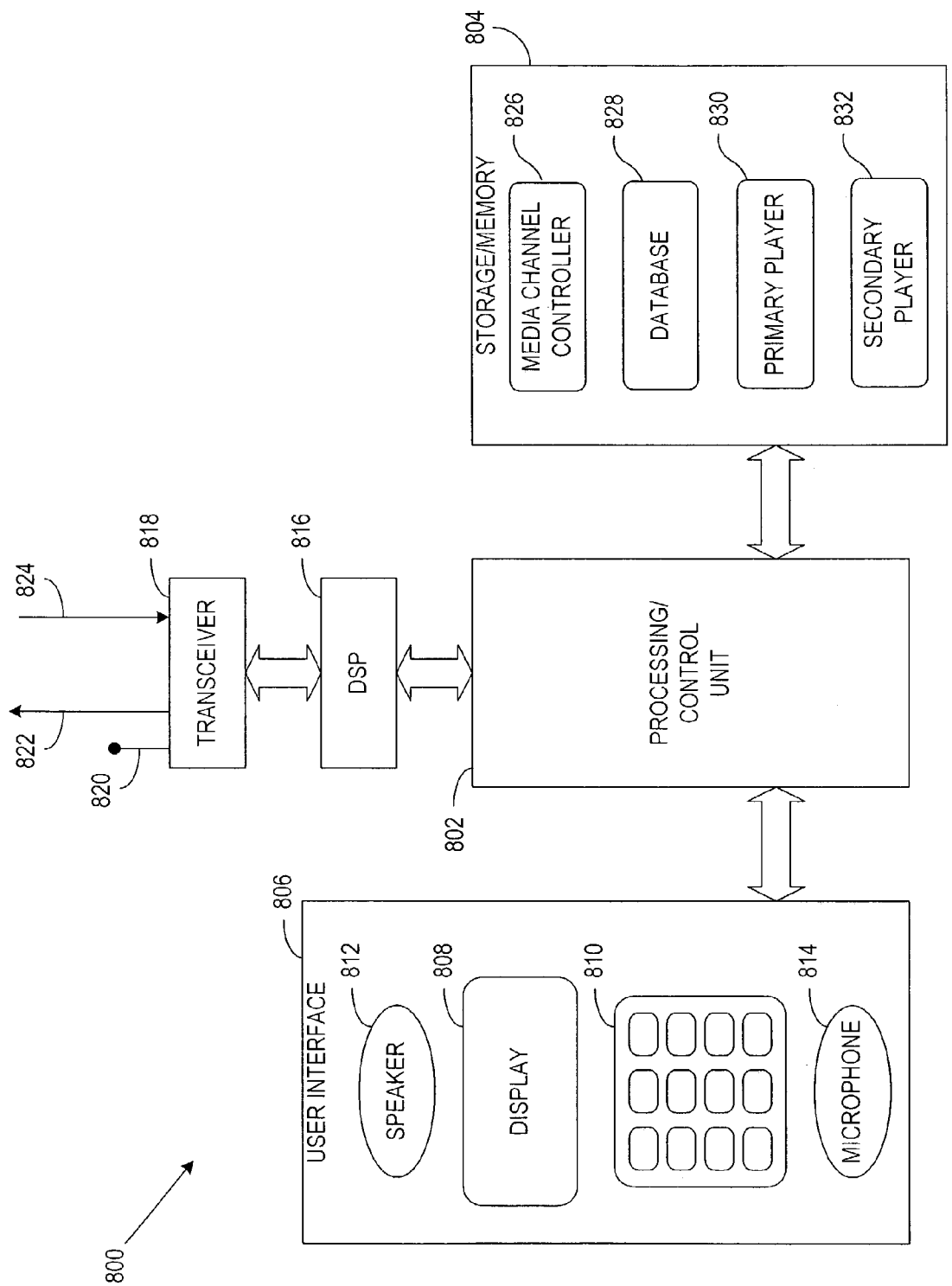
FIG. 8 illustrates an exemplary mobile computing environment in accordance with the present invention.

The invention is a modular invention, whereby processing functions within a mobile terminal may be utilized to implement the present invention. The mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various media channel control functions described herein. An example of a representative mobile terminal computing system capable of carrying out operations in accordance with the invention is illustrated in FIG. 8. Those skilled in the art will appreciate that the exemplary mobile computing environment 800 is merely representative of general functions that may be associated with such mobile devices, and also that landline computing systems similarly include computing circuitry to perform such operations.

The exemplary mobile computing arrangement 800 suitable for controlling media channels in accordance with the present invention may be associated with a number of different types of wireless devices. The representative mobile computing arrangement 800 includes a processing/control unit 802, such as a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile terminal, and also those functions associated with the present invention as dictated by media channel controller 826, database 828, primary player 830, and secondary player 832. Thus, the processing unit 802, in conjunction with media channel controller 826, is capable of controlling primary and secondary media channels associated with the present invention. The primary content channels are processed by primary player 830 and the secondary content channels are processed by secondary player 832, in accordance with parameters contained within database 828. The program storage/memory 804 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 804 are stored in non-volatile electrically-erasable, programmable ROM (EE- PROM), flash ROM, etc. so that the information is not lost upon power down of the mobile terminal. The relevant software for carrying out conventional mobile terminal operations and operations in accordance with the present invention may also be transmitted to the mobile computing arrangement 800 via data signals, such as being downloaded electronically via one or more networks, such as the Internet and an intermediate wireless network(s).

The processor 802 is also coupled to user-interface 806 elements associated with the mobile terminal. The user-interface 806 of the mobile terminal may include, for example, a display 808 such as a liquid crystal display, a keypad 810, speaker 812, and microphone 814. These and other user-interface components are coupled to the processor 802 as is known in the art. Other user-interface mechanisms may be employed, such as voice commands, switches, touch pad/screen, graphical user interface using a pointing device, trackball, joystick, or any other user interface mechanism.

The mobile computing arrangement 800 also includes conventional circuitry for performing wireless transmissions. A digital signal processor (DSP) 816 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 818, generally coupled to an antenna 820, transmits the outgoing radio signals 822 and receives the incoming radio signals 824 associated with the wireless device.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create media content channels in accordance with the present invention.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A media content channel system comprising:
  a first network element coupled to broadcast primary content;
  a second network element coupled to provide supplementary content via a digital communications channel, wherein the supplementary content includes a description of a predetermined interval for updating the secondary content based on the primary content;
  a user interface to receive user commands; and
  a mobile terminal coupled to receive the primary content via a broadcast media channel that is selected in response to the user commands, wherein the mobile terminal comprises a media channel controller coupled to detect the selection of the broadcast media channel and coupled to interactively download the supplementary content via the digital communications channel in response to the selection of a the broadcast media channel, wherein the mobile terminal further comprises a secondary player capable of receiving markup language content from the digital communications channel and make at least part of the supplementary content perceivable to a user of the mobile terminal, wherein the secondary player is configured to update the supplementary content at the predetermined interval.

2. The media content channel system according to claim 1, wherein the mobile terminal further comprises:
  a primary player coupled to the primary media content channel to play the primary content;
  a user interface to receive user selection commands; and
  a database coupled to the media channel controller, wherein the media channel controller retrieves channel selection parameters from the database in response to the selection commands.

3. The media content channel system according to claim 2, wherein the secondary player is configured to manually contact a source of the supplementary content in response to selection of the primary content.

4. The media content channel system according to claim 2, wherein the secondary player is configured to automatically contact a source of the supplementary content in response to selection of the primary content.

5. The media content channel system according to claim 4, wherein the secondary player includes a browser coupled to receive markup language content from the second network element.

6. The media content channel system according to claim 5, wherein the predetermined intervals are configured by the media channel controller.

7. The media content channel system according to claim 6, wherein the predetermined intervals are programmed into the database using the user interface.

8. The media content channel system according to claim 5, wherein the predetermined intervals are configured by the second network element.

9. The media content channel system according to claim 5, wherein the second network element is coupled to automatically provide the markup language content to the browser via Wireless Application Protocol (WAP) standards.

10. The media content channel system according to claim 5, wherein the browser comprises:

a first buffer to contain old markup language content received from the second network element; and a second buffer to contain new markup language content received from the second network element.

11. The media content channel system according to claim 10, wherein the browser is configured to determine differences between the old markup language content and the new markup language content.

12. The media content channel system according to claim 11, wherein the browser updates a display of the mobile terminal from the first buffer when no differences are found between the new markup language content and the old markup language content.

13. The media content channel system according to claim 11, wherein the browser updates a display of the mobile terminal from the second buffer when differences are found between the new markup language content and the old markup language content.

14. The media content channel system according to claim 13, wherein the display is updated only after all of the new markup language content is received from the second network element.

15. The media content channel system according to claim 5, wherein the user interface detects user interaction with the digital communications channel.

16. The media content channel system according to claim 15, wherein the digital communications channel is removed if no user interaction has been detected within a predetermined amount of time.

17. A mobile terminal capable of being wirelessly coupled to a network which includes a plurality of network elements capable of providing content, the mobile terminal comprising:

a memory capable of storing at least one of a media channel controller, a primary player, a secondary player capable of receiving markup language content via a digital communications channel, and a database;

a processor coupled to the memory and configured by the media channel controller to enable the secondary player to interactively download supplementary content via the digital communications channel in response to detecting that the primary player is selected to receive broadcast content, wherein the supplementary content is related to the broadcast content and contains a description of a predetermined interval for updating the secondary content based on the broadcast content, wherein the secondary player makes the supplementary content perceivable to a user of the mobile terminal, the secondary player is configured to update the supplementary content at the predetermined interval; and a transceiver configured to facilitate content exchange with the plurality of network elements via the digital communications channel.

18. The mobile terminal according to claim 17, wherein the user interface allows user interaction through one of audible, visual, or tactile inputs.

19. The mobile terminal according to claim 17, wherein the primary player provides audio and visual playback capability.

20. The mobile terminal according to claim 17, wherein the secondary player provides audio and visual playback capability.

21. The mobile terminal according to claim 20, wherein the secondary player further comprises a browser with markup language capability.

22. The mobile terminal according to claim 21, wherein the browser is configured by the media channel controller to automatically contact a Uniform Resource Locator (URL) in response to the primary player's media content channel activity.

23. The mobile terminal according to claim 22, wherein the URL is located in the database as being associated with the primary player's media content channel activity.

24. The mobile terminal according to claim 23, wherein the predetermined intervals are configured by the media channel controller.

25. The mobile terminal according to claim 23, wherein the predetermined intervals are configured by data contained at the location defined by the URL.

26. The mobile terminal according to claim 23, wherein the memory further comprises:

a first buffer coupled to store old data from the URL; and a second buffer coupled to store new data from the URL.

27. The mobile terminal according to claim 26, wherein the processor compares contents of the first buffer to contents of the second buffer.

28. The mobile terminal according to claim 27, wherein the processor updates a display of the mobile terminal from the first buffer if no differences exist between the contents of the first buffer and the contents of the second buffer.

29. The mobile terminal according to claim 27, wherein the processor updates a display of the mobile terminal from the second buffer if differences exist between the contents of the first buffer and the contents of the second buffer.

30. A computer-readable medium having instructions stored thereon which are executable by a mobile terminal for facilitating content channel creation by performing steps comprising:

establishing reception of content via a broadcast channel in response to a primary content channel request;

creating a digital communications channel in response to the primary content channel request, wherein the digital communications channel is capable of providing markup language content to the mobile terminal; and receiving content via the digital communications channel, wherein the supplementary content is related to the broadcast channel and includes a description of a predetermined interval for updating the secondary content based on the broadcast content;

making the supplementary content perceivable to a user of the mobile terminal; and updating the supplementary content at the predetermined interval.

31. A method comprising:

establishing a broadcast content channel with a mobile terminal in response to a broadcast content channel request received from a user of the mobile terminal;

creating a digital communications channel with the mobile terminal in response to the broadcast content channel request, wherein the digital communications channel is capable of providing markup language content to the mobile terminal;

interactively downloading supplementary content via the digital communications channel, wherein the supplementary content is related to content received via the broadcast content channel and includes a description of a predetermined interval for updating the secondary content based on the broadcast content;

making the supplementary content perceivable via the mobile terminal to a user of the mobile terminal; and updating the supplementary content at the predetermined interval.

32. The method according to claim 31, wherein creating the digital communications channel comprises:

retrieving parameters associated with the broadcast content channel;

analyzing the parameters associated with the broadcast content channel to determine the necessity of the digital communications channel; and establishing the digital communications channel when the parameters define a supplementary content channel to be created.

33. The method according to claim 32, wherein the parameters associated with the broadcast content channel include:

a broadcast frequency of a radio station; and a Uniform Resource Locator (URL) associated with the radio station.

34. The method according to claim 33, wherein the broadcast content channel is configured to receive broadcast content from the radio station and the digital communications channel is configured to receive markup language content from the location defined by the URL.

35. The method according to claim 32, wherein interaction with the digital communication channel is synchronized with broadcast content channel activity.

* * * * *

UNITED STATES PATENT AND TRADEMARK OFFICE
CERTIFICATE OF CORRECTION

| | |
|---|---|
| PATENT NO. | : 7,194,235 B2 |
| APPLICATION NO. | : 10/452949 |
| DATED | : March 20, 2007 |
| INVENTOR(S) | : Nykanen et al. |

It is certified that error appears in the above-identified patent and that said Letters Patent is hereby corrected as shown below:

Col. 5, line 40: "102, according the" should read --102, according to the--.

Col. 6, line 63: "In other words, mobile" should read --In other words, the mobile--.

Col. 8, line 26: "module 304 is" should read --module 304 in--.

Col. 9, line 21: "media content controller" should read --media channel controller--.

Col. 10, line 2: "station, radio" should read --station, the radio--.

Col. 16, line 24: "selection of a the broadcast" should read --selection of the broadcast--.

Signed and Sealed this

Nineteenth Day of June, 2007

JON W. DUDAS
*Director of the United States Patent and Trademark Office*